(12) United States Patent
Oon et al.

(10) Patent No.: US 7,351,949 B2
(45) Date of Patent: Apr. 1, 2008

(54) OPTICAL GENERIC SWITCH PANEL

(75) Inventors: Chin Hin Oon, Penang (MY); Kean Loo Keh, Penang (MY); Farn Hin Chen, Ipoh (MY); Calvin B. Ward, Castro Valley, CA (US)

(73) Assignee: Avago Technologies General IP Pte Ltd, Singapore (SG)

( * ) Notice: Subject to any disclaimer, the term of this patent is extended or adjusted under 35 U.S.C. 154(b) by 0 days.

(21) Appl. No.: 11/484,377

(22) Filed: Jul. 10, 2006

(65) Prior Publication Data

US 2008/0006766 A1   Jan. 10, 2008

(51) Int. Cl.
G06M 7/00 (2006.01)
H01J 40/14 (2006.01)

(52) U.S. Cl. .................. 250/221; 345/175; 345/176
(58) Field of Classification Search ............. 345/175, 345/176; 250/221
See application file for complete search history.

(56) References Cited

U.S. PATENT DOCUMENTS

| | | | |
|---|---|---|---|
| 4,305,071 A | 12/1981 | Bell et al. | |
| 4,542,375 A * | 9/1985 | Alles et al. | 345/176 |
| 4,561,017 A | 12/1985 | Greene | |
| 6,061,177 A | 5/2000 | Fujimoto | |
| 6,310,615 B1 | 10/2001 | Davis et al. | |
| 7,176,905 B2 | 2/2007 | Baharav et al. | |
| 2003/0081428 A1 | 5/2003 | Neta | |
| 2004/0252091 A1 | 12/2004 | Ma et al. | |
| 2005/0200294 A1 | 9/2005 | Naugler, Jr. et al. | |
| 2005/0212774 A1 | 9/2005 | Ho et al. | |
| 2006/0158437 A1 | 7/2006 | Blythe et al. | |
| 2006/0227120 A1 * | 10/2006 | Eikman | 345/175 |
| 2007/0046640 A1 | 3/2007 | Oon et al. | |

* cited by examiner

*Primary Examiner*—Georgia Epps
*Assistant Examiner*—Jennifer Bennett

(57) ABSTRACT

A switch panel having a touch plate, light converter, and light analyzer are disclosed. The touch plate includes an optically transparent layer having first and second surfaces, and having an index of refraction greater than that of air. The touch plate conducts light of an excitation wavelength between the first and second surfaces and emits part of that light through the second surface at one of a plurality of emission locations depending on the position at which pressure is applied to the first surface. The light converter is positioned to receive the light emitted through the second surface and generates light having a plurality of distinct location-specific spectra, one of the location-specific spectra corresponding to each of the emission locations. The light analyzer generates a signal indicative of which of the location-specific spectra was generated by the light converter.

17 Claims, 5 Drawing Sheets

OPTICAL GENERIC SWITCH PANEL

BACKGROUND OF THE INVENTION

Control systems for various apparatuses rely on a plurality of switches to input data to the apparatus. Switch arrays based on mechanical switches mounted on a surface are well known in this regard. Simulated switch arrays that utilize touch screens are also well known. Mechanical switch panels are difficult to reconfigure, and hence, tend to be customized for each application. This substantially increases the cost and product cycle time of devices that utilize such panels.

Input devices based on touch screens provide a convenient method for inputting commands in a manner that is easily reconfigurable. In such devices, the button pattern is displayed on the screen and the user selects a "button" by touching the screen over the button image. Touch screens, however, are significantly more expensive than conventional switches, and hence, are not always feasible for many applications. In addition, the ambient light intensity can interfere with the display that prevents the user from seeing the simulated buttons. Furthermore, the device cannot distinguish between an accidental light touch and an intended button push, since the screens do not provide a measure of the pressure with which the user has pressed his or her finger on the screen.

Many touch screen designs depend on detecting a change in some electrical parameter such as resistivity or capacitance that varies with the location on the screen at which the user touches the screen. Since the observed changes depend on the shape of the screen, custom screen sizes are limited and can require special programming.

Generic switch panels that overcome or that significantly reduce these problems are disclosed in co-pending U.S. patent application Ser. No. 10/810,157 filed Mar. 25, 2004 and Ser. No. 11/215,180 filed Aug. 29, 2005, which are hereby incorporated by reference. In those systems, a switch panel is constructed from a touch plate, image generator, and imaging system. The touch plate includes an optically transparent layer having first and second sides. The optically transparent layer has an index of refraction greater than that of air. A light source generates a light signal that is reflected between the first and second sides of the touch plate within the transparent layer. The imaging system records an image of the first surface of the touch plate. When a user presses a finger on the touch plate, a portion of the internally reflected light is reflected toward the second surface at an angle greater than the critical angle and the light escapes the second surface. The location of the bright spot created on that surface is recorded by the imaging system. A simulated button push is then generated based on the location of the detected bright spot.

While this type of system represents a significant improvement over prior art systems, there are still areas that could be improved. First, many users would prefer systems that provide feedback when the system recognizes a "button" as being pushed. While the system taught in this disclosure can provide that feedback by utilizing a sound generated by the controller when a touch is recorded, this requires additional programming and depends on some additional hardware being present with the touch screen, i.e., some form of sound generating apparatus.

Second, the system requires an imaging system that views the touch screen. Imaging systems require optics and a significant amount of space. The entire active area of the screen must be imaged on the imaging array. Hence, there must be a substantial distance from the screen to the imaging array. This increases the thickness of the display. In addition, the various optical components must be mounted and aligned, which increases the cost of the display. Finally, non-planar switch panels impose serious limitations on the optics, since the non-planar surface must be imaged onto the imaging array.

SUMMARY OF THE INVENTION

The present invention includes a switch panel having a touch plate, light converter, and light analyzer. The touch plate includes an optically transparent layer having first and second surfaces, and having an index of refraction greater than that of air. The touch plate conducts light of an excitation wavelength between the first and second surfaces and emits part of that light through the second surface at one of a plurality of emission locations. The specific location that emits light at any given time is determined by pressure, or a user's touch, that is applied to the first surface at a corresponding location. The light converter is positioned to receive the light emitted through the second surface at each of the plurality of emission locations. The light converter generates light having a plurality of distinct location-specific spectra, one of the location-specific spectra corresponding to each of the emission locations. The light analyzer generates a signal indicative of which of the location-specific spectra was generated by the light converter. In one aspect of the invention, the touch plate includes an image generator that displays an image having a plurality of button positions on the first surface. In another aspect of the invention, the light converter includes a layer of phosphor on a third surface, the layer of phosphor having a composition that is a function of position on the third surface. The light converter includes a light collector that collects a portion of the light generated on the third surface and couples the collected portion to the light analyzer. The light collector can include a transparent layer of material positioned to receive light leaving the third surface, a portion of the received light being internally reflected within the transparent layer and leaving the transparent layer through an edge thereof.

DETAILED DESCRIPTION OF THE PREFERRED EMBODIMENTS OF THE INVENTION

Figure 1:
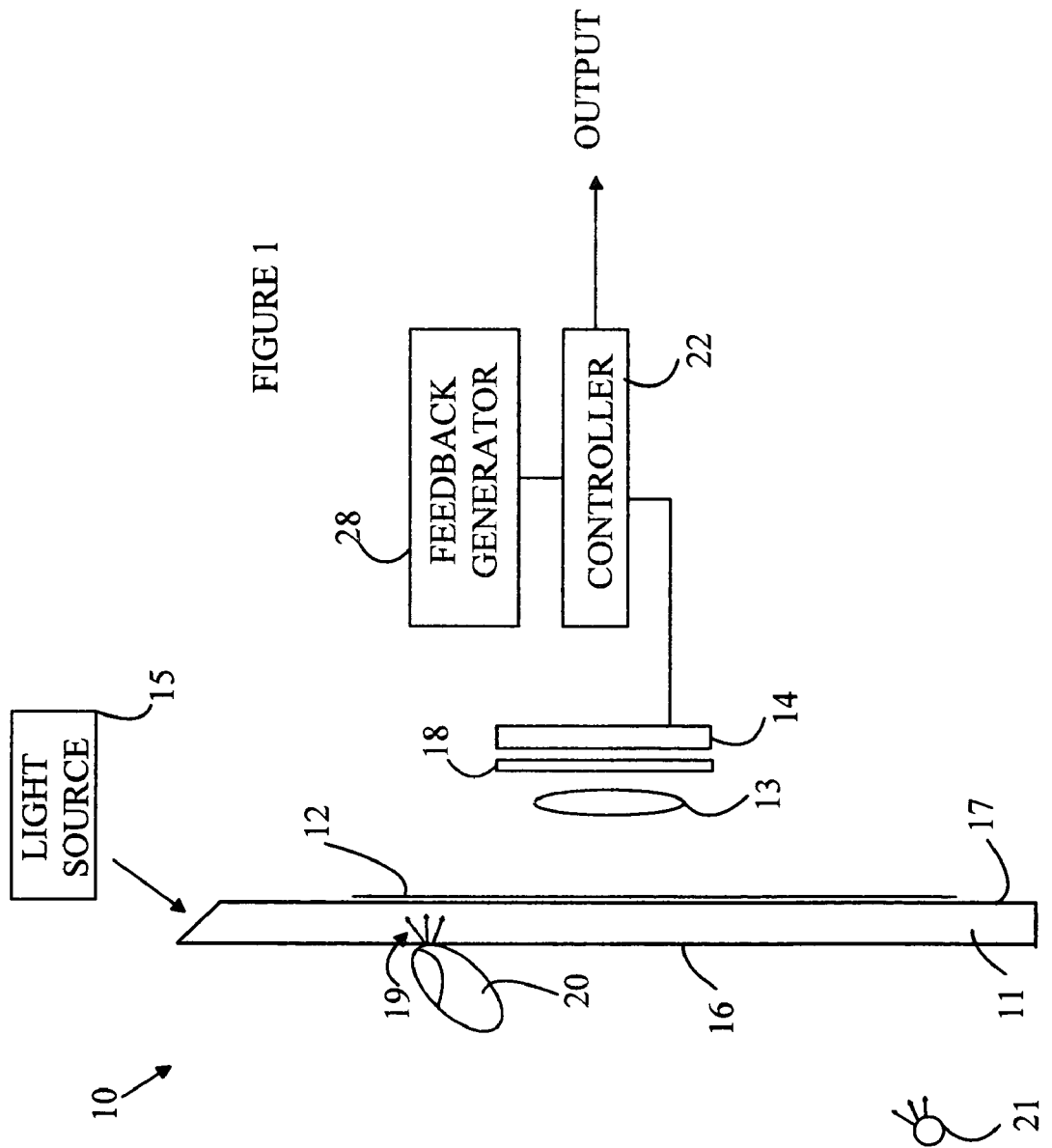
FIG. 1 is a cross-sectional view of a switch panel according to one embodiment of the invention described in the co-pending patent applications discussed above.

The manner in which the present invention provides its advantages can be more easily understood with reference to FIG. 1, which is a cross-sectional view of a switch panel 10 according to one embodiment of the invention described in the co-pending patent applications discussed above. Switch panel 10 utilizes a transparent screen 11 that emits light at the point of contact when a user presses the user's finger 20 against the screen.

Surface 16 is imaged onto a photodetector array 14 by lens 13. Photodetector array 14 can be constructed from a CCD camera array of the type used in optical mice, inexpensive cameras, or the like. The output of the photodetector array is processed by a controller 22 that generates an output signal indicative of the "button" pushed by the user.

The output "signal" generated by controller 22 can take a number of forms. For example, controller 22 can generate an electrical signal. In addition, controller 22 can include switches and/or relays that are actuated when controller 22 determines that a particular simulated button has been pushed. Further, controller 22 can include a light generator that is actuated to provide a light signal when a particular simulated button is pushed. In addition, some form of feedback signal can be provided by feedback generator 28.

A mask 12 behind screen 11 has pictures of "buttons" and various labels thereon. This mask is visible to the user. The mask is transparent to the light generated by screen 11 when the user touches the screen. The mask may be illuminated with a separate light source 21 to aid the user in visualizing the mask. The light source can be positioned either in front of screen 11 or behind screen 11. For the purposes of this discussion, it is sufficient to note that the wavelength of the illumination light is preferably different from that generated by the user touching screen 11. Hence, any stray illumination light can be easily separated at the photodetector array from the light signals generated by the user touching screen 11.

As noted above, screen 11 emits light when touched by the user. In one embodiment, screen 11 is a plate of glass, plastic, or similar transparent medium that is illuminated by a light source 15 from one end. The illumination angle is chosen such that the light will be internally reflected within the plate, and hence, the light is not visible to the user or the imaging system when so trapped. That is, the light strikes the surfaces of the touch screen at an angle that is less than the critical angle. The critical angle is determined by the index of refraction of the material from which the plate is constructed. The present invention preferably utilizes a material having an index of refraction greater than 1.25.

When the user presses on the surface, the user alters the index of refraction of the plate at the location on surface 16 at which the user's finger makes contact. Some of the light at this location escapes from the surface of the plate and is reflected by the user's finger as shown at 19. Some of this light will strike surface 17 at an angle greater than the critical angle, and hence, escape screen 11 and be imaged onto photodetector array 14.

To distinguish the light generated by the user's touch from other sources of stray light, light source 15 generates light of a predetermined wavelength. A filter 18 over photodetector array 14 is utilized to block light of wavelengths other than this wavelength. Hence, the point at which the user touches the screen appears to be a bright light source within the image formed on photodetector array 14.

Figure 2:
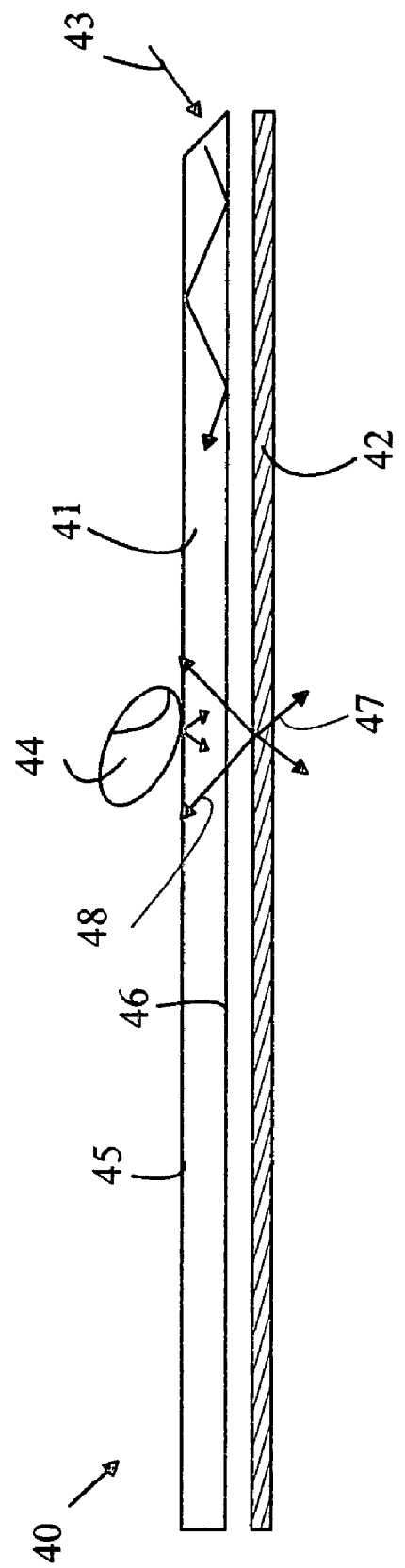
FIG. 2 is a cross-sectional view of a portion of a touch screen according to one embodiment of the present invention.

Refer now to FIG. 2, which is a cross-sectional view of a portion of a touch screen 40 according to one embodiment of the present invention. Touch screen 40 includes a first transparent layer 41 having a top surface 45 and a bottom surface 46. Layer 41 is illuminated from a light source 43 at an angle that assures that the light will be totally internally reflected between top surface 45 and bottom surface 46 in the absence of the user's finger 44. Touch screen 40 also includes a fluorescent layer 42 that is below layer 41. Fluorescent layer 42 contains a material that is excited by light of the wavelength provided by light source 43. Fluorescent layer 42 is separated from layer 41 by a distance that is sufficient to guarantee that the fluorescent material will not be excited by any fringe field created by the light in layer 41 that is being reflected between surfaces 45 and 46.

When a user touches surface 45, light is redirected out of bottom surface 46 in a manner analogous to that described above. The light leaving bottom surface 46 excites fluorescent layer 42 in the region below the point of contact. This results in the generation of a fluorescent light from the material in fluorescent layer 42. The fluorescent light will exit fluorescent layer 42 in all directions. In embodiments that utilize an imaging system to determine the point of contact, some of the light shown at 47 will be imaged by the imaging system. Some of the light shown at 48 will be seen by the user as a halo surrounding the user's finger at the point of contact. This light provides a feedback signal without requiring a separate feedback generator.

In addition, the fluorescent material can be chosen such that the light emitted by the material is substantially different in intensity and/or wavelength than the ambient light. For example, there is a class of fluorescent materials referred to as quantum dot phosphors that emit light in a very narrow band of wavelengths that can be selected by choosing the size of the phosphor particles. Hence, a narrow bandpass filter can be used to block the ambient light while allowing substantially all of the fluorescent light through.

Figure 3:
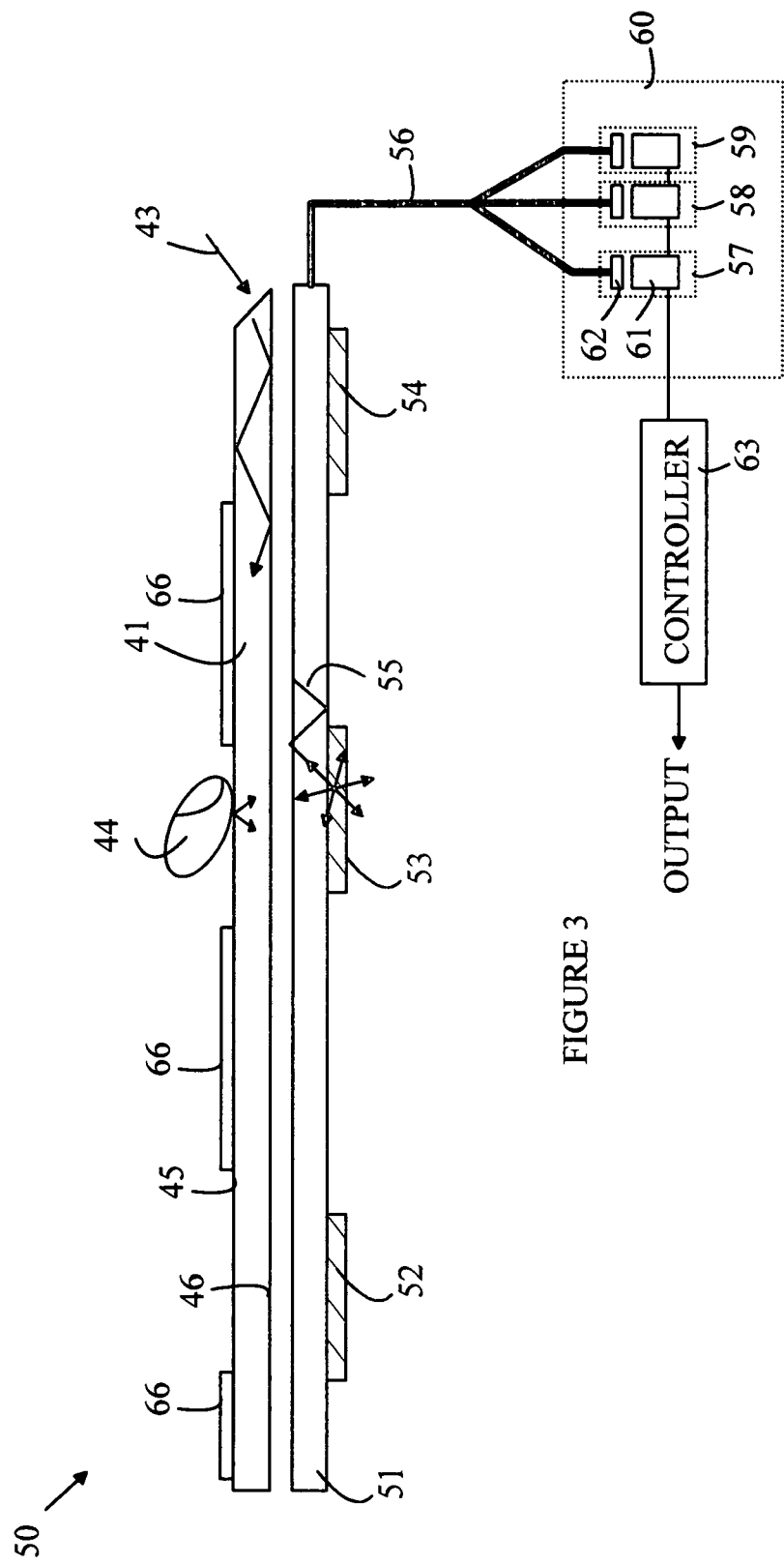
FIG. 3 illustrates a portion of a touch panel according to one embodiment of the present invention that does not require an imaging system.

Refer now to FIG. 3, which illustrates a portion of a touch panel 50 according to one embodiment of the present invention that does not require an imaging system. Touch panel 50 is limited to a predetermined maximum number of "buttons". To simplify the following discussion, the number of buttons implemented by panel 50 is three. Touch panel 50 utilizes a clear layer 41 that is illuminated from a light source 43 that has a spectrum that will excite a plurality of different phosphors. Light from layer 41 is caused to exit bottom surface 46 when the user 44 presses on the top surface of layer 41 in a manner analogous to that described above. The light leaving bottom surface 46 passes through a clear light pipe 51 and strikes an area covered with a fluorescent material. For example, light leaving the layer 41 in response to the user's finger 44 touching the panel at the location shown in the figure strikes fluorescent area 53, which, in turn, generates light of a fluorescent wavelength associated with that area. Similar "button" sites are positioned over fluorescent areas 52 and 54.

Light pipe 51 can be constructed from a layer of glass, plastic, or other transparent material. Light pipe 51 can be a rectangular sheet of material with the phosphor areas printed thereon via silk screening or other suitable method. Light pipe 51 can easily be changed to provide touch screens with different numbers of buttons and/or buttons in different locations.

Each phosphor area on light pipe 51 generates light having a spectrum that is unique to that area. For example, this can be accomplished by using a different quantum dot phosphor in each area. In another embodiment, each area utilizes a combination of phosphors with the ratio of the particular phosphors in each area being unique to that area.

The light generated in area 53 will exit in all directions. Some of the light will leave through the top surface of layer 41 and be seen by the user as a halo about the location of the user's finger. Some of the light will be trapped by internal reflection in light pipe 51 as shown at 55. The light trapped in light pipe 51 will eventually reach the end surface of the light pipe, and a portion of that light will be coupled into optical fiber 56. The light collected by optical fiber 56 is delivered to a spectrum analyzer 60.

In the example shown in FIG. 3, spectrum analyzer 60 utilizes a number of photodetectors 57-59, one photodetector corresponding to each potential button. Each photodetector measures the light generated at a characteristic wavelength that is particular to the corresponding phosphor area. The photodetectors can be constructed from a bandpass filter 62 and a photodiode 61. In embodiments in which different ratios of phosphors are used in each phosphor area, there will typically be one photodetector for each phosphor. A controller 63 processes the data from spectrum analyzer 60 to provide an output indicating the identity of the "button" that was pressed.

It should be noted that the phosphor spots can be constructed from a combination of phosphors with different spots having different relative quantities of the phosphors. For example, each spot could include 4 phosphors and spectrum analyzer 60 would include 4 photodetectors that quantize the light received from each phosphor. In the simplest embodiment, each spot is characterized by a 4-bit number in which a bit defined as "1" if a particular phosphor is present in the spot, and the bit is "0" if the phosphor is absent. Hence, a total of 15 buttons can be implemented using only four distinct phosphors. If the intensity of each phosphor can be measured, even more buttons can be implemented, since each phosphor can define a number of values depending on the amount of phosphor at that spot.

The image that is displayed to the user and defines the actual areas that are to be touched to provide a push button can be placed in front of surface 45. For example, the display can be printed on the front surface of layer 41 as shown at 66. In the embodiment shown in FIG. 3, the button areas are left uncovered.

Figure 4:
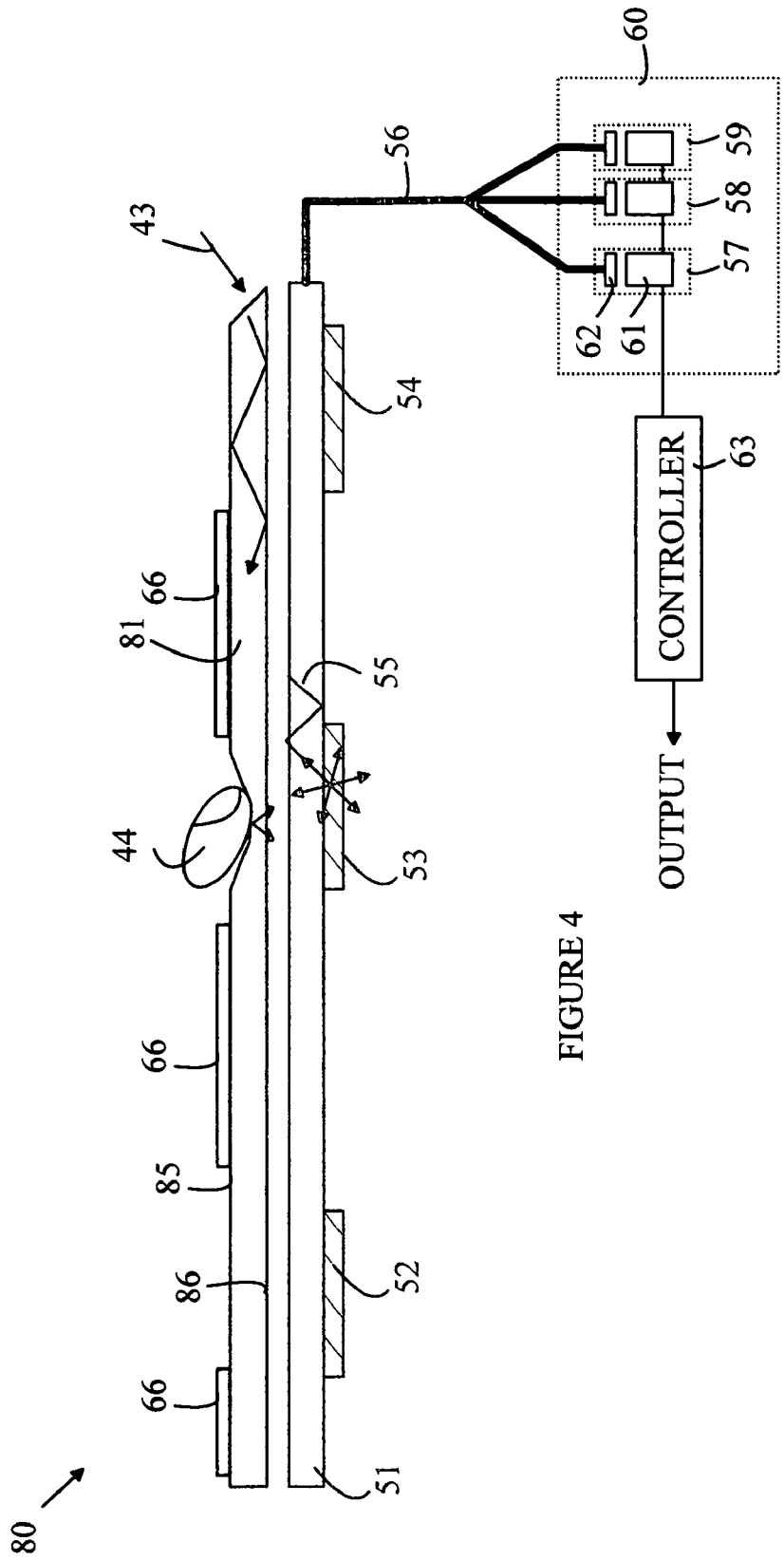
FIG. 4 is a cross-sectional view of a button panel according to another embodiment of the present invention.

The above-described embodiments of the present invention utilize a rigid plate in which light is trapped by internal reflection. These embodiments rely on the interaction of the user's finger and the surface of the touch plate to interrupt the internal reflection of the light. These embodiments are less effective if the object pressed against the plate does not "wet" the surface of the touch plate. The need to wet the surface can be overcome by utilizing a touch plate that has a flexible surface. Refer now to FIG. 4, which is a cross-sectional view of a button panel 80 according to another embodiment of the present invention. To simplify the following discussion, those elements of button panel 80 that serve functions analogous to elements of button panel 40 described above have been given the same numeric designations and will not be discussed further here. Button panel 80 utilizes a flexible layer of transparent medium 81 having top and bottom surfaces 85 and 86, respectively.

Light is trapped between the top and bottom surfaces of layer 81 in the absence of an object pushing on surface 85. It will be assumed that the bottom surface of layer 81 is ridged. When the user's finger presses on the top surface of layer 81, the flexible layer 81 is depressed and light is reflected from this depressed surface at an angle greater than the critical angle, and hence, escapes layer 81 and enters light pipe 51 where it causes one of the fluorescent areas to emit light in the manner discussed above. It should be noted that surface 85 could also be coated with a partially reflecting material to enhance the reflection of light at the point of depression.

Figure 5:
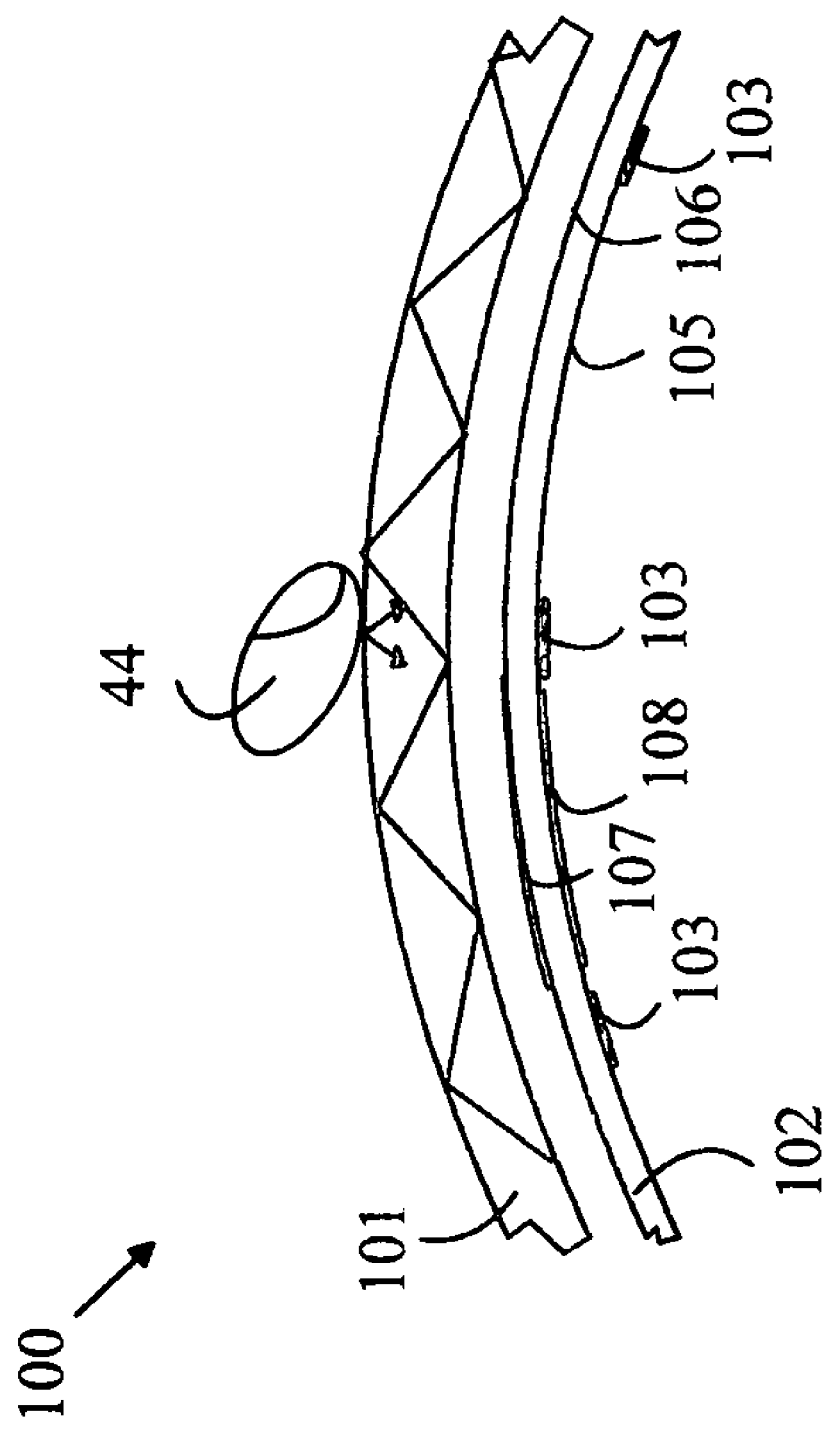
FIG. 5 is a cross-sectional view of a portion of a switch panel in which the touch plate is curved.

The above-described embodiments utilize a touch plate that is flat. However, embodiments in which the touch plate is curved can also be constructed. Refer now to FIG. 5, which is a cross-sectional view of a portion of a switch panel 100 in which the touch plate layer 101 is curved. Touch plate 101 is illuminated by a light source that inserts light into layer 101 at an angle that is sufficiently small to cause the light to be trapped between the top and bottom surfaces of layer 101. To simplify the drawing, the illumination source has been omitted.

This embodiment requires that the angle of curvature of layer 101 is sufficiently small that light so trapped will not strike the surface at an angle greater than the critical angle in the region of layer 101 that corresponds to "buttons" that the user can push. It should be noted that the touch plate can have a varying radius of curvature that allows light to escape in the other "non-button" areas of the plate provided the light intensity remains sufficient in the button areas. Such an arrangement can be utilized to provide labels that are illuminated by the light within layer 101.

The light from layer 101 that results from a user touching the surface of layer 101 is reflected into a light pipe 102 having fluorescent areas 103 that operate in a manner analogous to that described above. Light pipe 102 can also be curved as shown in the drawing. However, it should be noted that light pipe 102 could have a different radius of curvature from layer 102. In fact, embodiments in which light pipe 102 is flat can also be practiced provided the fluorescent areas are sufficiently separated in space.

It should also be noted that the surface of light pipe 102 need only be transparent in the regions between the positions at which the user presses on layer 101 and the fluorescent areas 103. Hence, the surface 105 could be covered with a reflective coating to increase the amount of light that is trapped within light pipe 102 as shown at 108. Similarly, the portions of light pipe 102 on surface 106 that are not required to be transparent could also be covered with a reflective coating as shown at 107.

Various modifications to the present invention will become apparent to those skilled in the art from the foregoing description and accompanying drawings. Accordingly, the present invention is to be limited solely by the scope of the following claims.

What is claimed is:

1. A switch panel comprising:
    a touch plate comprising an optically transparent layer having first and second surfaces, said optically transparent layer having an index of refraction greater than that of air, said touch plate conducting light of an excitation wavelength between said first and second surfaces and emitting part of said light through said second surface at one of a plurality of emission locations determined by pressure being applied to said first surface at a corresponding location;
    a light converter positioned to receive said light emitted through said second surface at each of said plurality of emission locations, said light converter generating light having a plurality of distinct location-specific spectra, one of said location-specific spectra corresponding to each of said emission locations, said one of said location-specific spectra being determined by said emission location, said light converter comprising a layer of phosphor on a third surface, said layer of phosphor having a composition that is a function of position on said third surface; and
    a light analyzer that generates a signal indicative of which of said location-specific spectra was generated by said light converter.

2. The switch panel of claim 1 wherein said touch plate comprises an image generator that displays an image comprising a plurality of button positions on said first surface.

3. The switch panel of claim 1 wherein said light converter comprises a light collector that collects a portion of said light generated on said third surface and couples said collected portion to said light analyzer.

4. The switch panel of claim 3 wherein said light collector comprises a transparent layer of material positioned to receive light leaving said third surface, a portion of said received light being internally reflected within said transparent layer and leaving said transparent layer through an edge thereof.

5. The switch panel of claim 4 wherein said transparent layer of material comprises a reflective surface over selected portions of said transparent layer, said selected portions being positioned such that light leaving said second surface of said touch plate can still reach said layer of phosphor while a portion of said light emitted by said phosphor is reflected on said reflective surface.

6. The switch panel of claim 1 wherein a portion of said light is reflected toward said second surface at an angle greater than the critical angle in said optically transparent layer when a force greater than a predetermined force is applied to a location on said first surface.

7. The switch panel of claim 1 wherein said first surface deforms sufficiently when a predetermined pressure is applied thereto to cause a portion of said light to be reflected toward said second surface at an angle greater than the critical angle in said optically transparent layer.

8. A switch panel comprising:
a touch plate comprising an optically transparent layer having first and second surfaces, said touch plate conducting light between said first and second surfaces and emitting part of said light through said second surface at one of a plurality of emission locations determined by pressure being applied to said first surface at a corresponding location; and
a light converter positioned to receive said light emitted through said second surface at each of said plurality of emission locations, said light converter comprising a fluorescent layer on a third surface, said fluorescent layer generating fluorescent light using said light emitted through said second surface that indicates said corresponding location of said pressure being applied to said first surface.

9. The switch panel of claim 8 further comprising a photodetector array to image said fluorescent light from said fluorescent layer.

10. The switch panel of claim 8 wherein said touch plate comprises an image generator that displays an image comprising a plurality of button positions on said first surface.

11. The switch panel of claim 10 wherein said light analyzer is configured to generate said signal from a plurality of signals that correspond to different spectra so that said signal indicates the spectrum of said fluorescent light.

12. The switch panel of claim 10 wherein said light converter comprises a light collector that collects a portion of said fluorescent light and couples said collected portion to said light analyzer.

13. The switch panel of claim 12 wherein said light collector comprises a transparent layer of material positioned to receive said fluorescent light, a portion of said received fluorescent light being internally reflected within said transparent layer and leaving said transparent layer through an edge thereof.

14. The switch panel of claim 13 wherein said transparent layer of material comprises a reflective surface over selected portions of said transparent layer, said selected portions being positioned such that light leaving said second surface of said touch plate can still reach said fluorescent layer while a portion of said fluorescent light is reflected on said reflective surface.

15. The switch panel of claim 8 further comprising a light analyzer that generates a signal in response to said florescent light that indicates said corresponding location of said pressure being applied to said first surface.

16. The switch panel of claim 8 wherein a portion of said light is reflected toward said second surface at an angle greater than the critical angle in said optically transparent layer when a force greater than a predetermined force is applied to a location on said first surface.

17. The switch panel of claim 8 wherein said first surface deforms sufficiently when a predetermined pressure is applied thereto to cause a portion of said light to be reflected toward said second surface at an angle greater than the critical angle in said optically transparent layer.

* * * * *